United States Patent [19]

Newkirk et al.

[11] Patent Number: 5,106,698
[45] Date of Patent: Apr. 21, 1992

[54] CERAMIC ARTICLES WITH A MODIFIED METAL-CONTAINING COMPONENT

[75] Inventors: Marc S. Newkirk; Andrew W. Urquhart, both of Newark, Del.; Harry R. Zwicker, Elkton, Md.

[73] Assignee: Lanxide Technology Company, LP, Newark, Del.

[21] Appl. No.: 326,903

[22] Filed: Mar. 17, 1989

Related U.S. Application Data

[63] Continuation of Ser. No. 896,481, Aug. 13, 1986, Pat. No. 4,868,143.

[51] Int. Cl.$^5$ ............................................. C22C 29/00
[52] U.S. Cl. ................................... 428/545; 428/565; 428/552; 428/568; 428/628
[58] Field of Search ............... 428/545, 565, 552, 628, 428/568

[56] References Cited

U.S. PATENT DOCUMENTS

| | | |
|---|---|---|
| 2,741,822 | 11/1956 | Udy . |
| 3,031,340 | 4/1962 | Girardot . |
| 3,255,027 | 6/1966 | Talsma . |
| 3,285,714 | 11/1966 | Davies et al. ............... 428/545 |
| 3,296,002 | 1/1967 | Hare . |
| 3,298,842 | 1/1967 | Seufert . |
| 3,419,404 | 12/1968 | Mao . |
| 3,421,863 | 1/1969 | Bawa . |
| 3,437,468 | 4/1969 | Seufert . |
| 3,473,938 | 10/1969 | Oberlin . |
| 3,473,987 | 10/1969 | Sowards . |
| 3,608,170 | 9/1971 | Larson . |
| 3,770,488 | 11/1973 | Pepper . |
| 3,789,096 | 1/1974 | Church . |
| 3,864,154 | 2/1975 | Gazza et al. . |
| 3,867,177 | 2/1975 | Ott . |
| 3,868,267 | 2/1975 | Gazza . |
| 3,969,553 | 7/1976 | Kondo . |
| 3,973,977 | 8/1976 | Wilson . |
| 4,713,360 | 12/1987 | Newkirk . |
| 4,731,115 | 3/1988 | Abkowitz et al. ............... 428/565 X |
| 4,743,511 | 5/1988 | Sowman et al. ............... 428/545 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys. Reaction with Refractories"—M. Drouzy and M. Richard—Mar., 1974—Fonderie, France No. 332, pp. 121-128.
"Refractories for Aluminum Alloy Melting Furnaces'-'—B. Clavaud and V. Jost—Sep., 1980—Lillian Brassinga (from French) Jan., 1985.

*Primary Examiner*—Karl Group
*Attorney, Agent, or Firm*—Mark G. Mortenson; Carol A. Lewis

[57] ABSTRACT

Self-supporting ceramic bodies having a modified metal-containing component are formed by first providing a self-supporting ceramic body comprising (1) a polycrystalline oxidation reaction product formed upon oxidation of a molten parent metal precursor with an oxidant, and (ii) an interconnected metal-containing component at least partially accessible from one or more surfaces of said ceramic body. The surface or surfaces of the ceramic body are contacted with a quantity of foreign metal different from said interconnected metal-containing component at a temperature and for a time sufficient to allow for interdiffusion, whereby at least a portion of said metal-containing component is displaced by said foreign metal. The resulting ceramic body, having an altered metal-containing component, exhibits modified or improved properties.

9 Claims, 3 Drawing Sheets

CERAMIC ARTICLES WITH A MODIFIED METAL-CONTAINING COMPONENT

This is a continuation of co-pending application Ser. No. 896,481 filed on Aug. 13, 1986, now U.S. Pat. No. 4,868,143.

BACKGROUND

1. Field of the Invention

The present invention relates generally to a method of modifying a metal component of a self-supporting ceramic body, and to the modified product. More particularly, this invention relates to self-supporting ceramic bodies formed as the oxidation reaction product of a parent metal and having an interconnected metal-containing component modified in a post-forming step. The invention also relates to methods for producing such ceramic bodies.

2. Description of Commonly Owned Patent Applications and Prior Art

The subject matter of this application is related to U.S. Pat. No. 4,713,360 issued on Dec. 15, 1987 in the name of Marc S. Newkirk et al and entitled "Novel Ceramic Materials and Methods of Making Same." This patent issued from commonly owned U.S. patent application Ser. No. 818,943, filed Jan. 15, 1986, which was a continuation-in-part of Ser. No. 776,964, filed Sept. 17, 1985, which was a continuation-in-part of Ser. No. 705,787, filed Feb. 26, 1985, which was a continuation-in-part of U.S. application Ser. No. 591,392, filed Mar. 16, 1984, all in the name of Marc S. Newkirk et al. and entitled "Novel Ceramic Materials and Methods for Making the Same." These applications disclose the method of producing self-supporting ceramic bodies grown as the oxidation reaction product from a parent metal precursor. Molten parent metal is reacted with a vapor-phase oxidant to form an oxidation reaction product, and the metal migrates through the oxidation product toward the oxidant thereby continuously developing a ceramic polycrystalline body which can be produced having an interconnected, metallic component. The process may be enhanced by the use of an alloyed dopant, such as in the case of an aluminum parent metal oxidized in air. This method was improved by the use of external dopants applied to the surface of the precursor metal as disclosed in commonly owned and copending U.S. patent applications Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636, filed July 20, 1984, all in the name of Marc S. Newkirk et al and entitled "Methods of Making Self-Supporting Ceramic Materials."

The subject matter of this application is also related to that of commonly owned and copending U.S. Pat. No. 4,851,375, issued July 25, 1989, and entitled "Methods of Making Composite Ceramic Articles having Embedded Filler", in the names of Marc S. Newkirk et al. This patent issued from application Ser. No. 819,397, filed Jan. 17, 1986 and allowed on Aug. 1, 1988, which is a continuation-in-part of Ser. No. 697,876, filed Feb. 4, 1985, both in the names of Marc S. Newkirk et al. and entitled "Composite Ceramic Articles and Methods of Making Same". This patent disclose a novel method for producing self-supporting ceramic composites by growing an oxidation reaction product from a parent metal into a permeable mass of filler, thereby infiltrating the filler with a ceramic matrix.

Composite bodies comprising a metal boride, a metal component and, optionally, an inert filler are disclosed in U.S. Pat. No. 4,777,014 which issued on Oct. 11, 1988 in the names of Marc S. Newkirk et al and entitled "Process for Preparing Self-Supporting Bodies and Products Made Thereby." This patent issued from commonly owned and U.S. patent Ser. No. 837,448, filed Mar. 7, 1986, in the name of Marc S. Newkirk et al. and entitled "Process for Preparing Self-Supporting Bodies and Products Made Thereby." According to this invention, molten parent metal infiltrates a mass of a boron source, which may be admixed with an inert filler, and reacts with the boron source thereby forming a parent metal boride. The conditions are controlled to yield a composite body containing varying volume percents of ceramic and metal.

The entire disclosure of all of the foregoing commonly owned patent applications are expressly incorporated herein by reference.

Common to each of these commonly owned patent applications is the disclosure of embodiments of a ceramic body comprising an oxidation reaction product interconnected in one or more dimensions (usually in three dimensions) and one or more metallic constituents or components. The volume of metal, which typically includes non-oxidized constituents of the parent metal and/or metal reduced from an oxidant or filler, depends on such factors as the temperature at which the oxidation reaction product is formed, the length of time at which the oxidation reaction is allowed to proceed, the composition of the parent metal, the presence of dopant materials, the presence of reduced constituents of any oxidant or filler materials, etc. Although some of the metallic components may be isolated or enclosed, it is frequently the case that a substantial volume percent of metal will be interconnected and accessible from an external surface of the ceramic body. It has been observed for these ceramic bodies that this interconnected metal-containing component or constituent can range from about 1 to about 40 percent by volume, and sometimes higher as, for example, in the case of a boride composite.

In many applications for ceramic bodies having an interconnected, metal-containing component, the metal component contributes to, and may enhance, the properties of the ceramic body. In particular, the metal-containing component, due to its greater ductility, may contribute to the toughness or fracture resistance of the ceramic body. Likewise, the metallic constituent can be useful in providing a controlled degree of electrical conductivity in the ceramic body.

However, it also has been observed that for certain applications, the interconnected, metal-containing component may not provide the optimum properties for the intended use, and in some cases it can even detract from the performance of the ceramic body. For example, when the parent metal used in producing an alumina ceramic body is primarily aluminum and the resulting interconnected metal is substantially aluminum or aluminum alloy(s), it has been observed that although the ceramic body functioning at normal conditions may exhibit good fracture toughness or wear resistance, it can be degraded either by subjection to temperatures above the relatively low melting point of aluminum of approximately 660° C., or by subjection to aqueous acid or alkaline environments which corrode away the aluminum constituent. It has been found that when the interconnected metal is so degraded, certain properties of the ceramic body, such as fracture toughness, strength, or wear resistance, are adversely affected. Likewise, in other product uses for such ceramic bodies, it has been observed that the interconnected metallic-containing constituent may not provide the optimum properties for the intended use, such as electrical conductivity, microhardness, etc.

It is known that graphite yarn can be impregnated with a metal matrix in order to improve certain properties of the yarn, and U.S. Pat. No. 3,770,488 to Pepper et al. discloses one such method for impregnating graphite yarn with an aluminum or magnesium matrix. In order to achieve proper wettability of the graphite yarn with the desired metal, the yarn is first infiltrated by another metal. The infiltrated yarn is then contacted with a molten bath of the desired metal impregnate which leaches out the metal infiltrate thereby forming a yarn reinforced by the desired metal matrix. This patent, however, is specific to graphite yarn, and further does not suggest that a polycrystalline ceramic body having residual interconnected metal can be modified in a post-forming operation.

SUMMARY OF THE INVENTION

Briefly, the present invention is directed to a method of replacing a significant amount of an interconnected metallic component, which is incorporated into the ceramic body during its formation, with a foreign or second metal in a post-forming step. The foreign metal is selected so as to modify the properties of the ceramic body originally formed for its intended end use. In accordance with the method of the present invention, a ceramic body is formed by the oxidation reaction of a parent metal precursor with an oxidant, such as described above in connection with the commonly owned patent applications. The ceramic body has an interconnected, metallic-containing constituency or component which is distributed through at least a portion of the ceramic body in one or more dimensions, and further is at least partially open or accessible from at least one external surface of the body. The ceramic body is contacted at such surface with a quantity of a foreign metal from an extrinsic source that is different in composition from the interconnected metal constituent or component and that can be interdiffused with the interconnected metal constituent.

Interdiffusion of the two metals occurs (i.e., outward diffusion of the metal-containing constituent originally in the ceramic body and inward diffusion of the foreign metal). Preferably one or both metal components are molten in order to facilitate the interdiffusion of metal. The volume of foreign metal, the area of contact with the foreign metal, the temperature ranges, and the length of time the ceramic body is left in contact with the foreign metal, are selected so as to allow for the desired amount of interdiffusion of the two metals. A significant portion of the metal-containing component originally in the ceramic body is at least partially displaced by one or more constituents of the foreign metal which then becomes integral with the ceramic body. The metal content of the ceramic body, and therefore certain of its properties, is thereby modified.

The self-supporting ceramic body of the present invention comprises a polycrystalline oxidation reaction product having (a) interconnected reaction product crystallites formed upon oxidation of a molten parent metal with an oxidant, and (b) an interconnected metal-containing component at least partially open from the surface(s) of the ceramic body. At least a portion of this metallic component is displaced with a quantity of a foreign metal different in composition (i.e., in ingredients and/or proportions) from the originally-formed, interconnected metallic constituency, thereby modifying one or more properties of the ceramic body originally produced from oxidant-metal oxidation reaction.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents (interconnected and isolated) derived from the parent metal or produced from the oxidant, dopant, or filler, most typically within a range of from about 1–40% by volume, but may include still more metal.

"Oxidation reaction product" generally means one or more metals in any oxidized state wherein the metal has given up electrons to or shared electrons with another element, compound, or combination thereof. Accordingly, an "oxidation reaction product" under this definition includes the product of reaction of one or more metals with an oxidant such as those described herein.

"Oxidant" means one or more suitable electron acceptors or electron sharers and may be a solid, a liquid or a gas (vapor) or some combination of these (e.g., a solid and a gas) at the process conditions.

"Metal" as used in the terms "parent metal" and "foreign metal" is intended to refer to relatively pure metals, commercially available metals with impurities and/or alloying constituents therein, and alloys and intermetallic compounds of the metals. When a specific metal is mentioned, the metal identified should be read with this definition in mind unless indicated otherwise by the context. For example, when aluminum is the parent metal, the aluminum may be relatively pure metal (e.g. commercially available aluminum of 99.7% purity), or 1100 aluminum having as nominal impurities of about 1% by weight silicon plus iron, or aluminum alloys such as, for example, 5052.

DETAILED DESCRIPTION OF THE INVENTION AND THE PREFERRED EMBODIMENTS

In accordance with the method of this invention, a self-supporting ceramic body having an interconnected metallic component, at least partially open or accessible from an external surface (or surfaces), is contacted with a foreign metal causing a concentration gradient. Typically, the ceramic body and the foreign metal are heated to a temperature above the melting point of the interconnected metal in the ceramic body or the foreign metal, or both. Interdiffusion between the metallic component and the foreign metal occurs because of the concentration gradient. A significant or substantial amount of the metal-containing component is displaced by the foreign metal which becomes integral with the final ceramic body, thereby modifying or altering the properties of the ceramic body. Although the invention is described below with particular reference to aluminum as the parent metal, it should be understood that other parent metals are also applicable, such as silicon, titanium, tin, zirconium, and hafnium.

Figure 1:
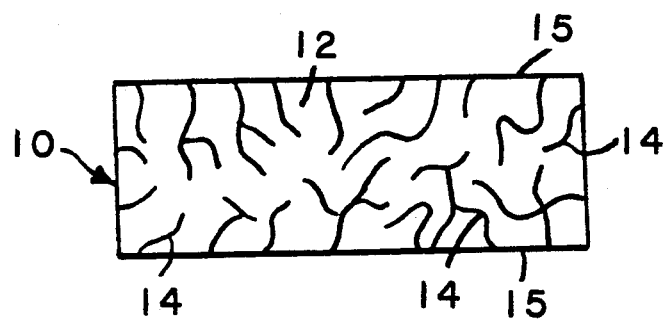
FIG. 1 is a schematic view of a ceramic body of the type treated according to the process of this invention.

Referring to FIG. 1, a self-supporting ceramic body 10 is first provided, which is made, for example, by any of the above referred to Commonly Owned Patents and Patent Applications. Accordingly, a parent metal, e.g. aluminum, which may be doped (as explained below in greater detail) is provided as the precursor to the oxidation reaction product. The parent metal is melted within an appropriate temperature envelope in or immediately adjacent to an oxidizing environment. At this temperature, or within this temperature range, the molten metal reacts with the oxidant to form a polycrystalline oxidation reaction product. At least a portion of the oxidation reaction product is maintained in contact with and between the molten metal and the oxidant to draw molten metal through oxidation reaction product and into contact with the oxidant such that the oxidation reaction product continues to form at the interface between the oxidant and previously formed oxidation reaction product. The reaction is continued for a time sufficient to form the polycrystalline ceramic body consisting essentially of the oxidation reaction product 12 and an interconnected metallic-containing component or constituent 14 dispersed or distributed through part or substantially all of the polycrystalline material. This metal component, formed in situ during formation of the polycrystalline oxidation reaction product, is at least partially open or accesible from at least one surface, as at surfaces 15, of the ceramic body. It should be understood that the polycrystalline material may exhibit some isolated metal and also voids or porosity (not shown), which may have replaced some of the interconnected metal component, but the volume percents of metal (interconnected and isolated) and voids will depend largely on such conditions as temperature, time, dopants, and type of parent metal.

The ceramic body is subsequently contacted on one or more of its surfaces 15 with a second or foreign metal 16 derived from an external source, and may be contained in a suitable vessel or crucible 18, whereby interdiffusion occurs. (See FIG. 2.) It should be understood that interdiffusion between the metal component formed in situ during formation of the polycrystalline oxidation reaction product and metal from an extrinsic source may be solid-solid, solid-liquid, liquid-solid, or liquid-liquid, wherein such terms refer to the state of the foreign metal and the metallic constituent of the intial ceramic body, respectively. The liquid-liquid case is normally preferred because such a system results in a beneficially altered end product in a shorter period of time. Even in the case of solid-solid interdiffusion, liquid-phase transport can occur if the interdiffusion temperature is above the minimum melting point of the combined metals, as in the case of a eutectic system. The foreign metal, which may be a relatively pure metal, an alloy, or an intermetallic, is selected so as to alter the composition of the interconnected metal-containing component thereby modifying the properties of the final ceramic product. Typically, the properties modified include, for example, fracture toughness, hardness, wear resistance, electrical conductivity, thermal conductivity, or chemical stability (i.e., resistance to corrosion or oxidation, etc.). The specific application for which the ceramic body is intended will determine which properties need to be modified or optimized through the selection of a particular foreign metal.

The second or foreign metal selected will depend largely on the end properties sought, and also on certain other factors such as temperature, time, miscibility, etc., as explained below in greater detail. Suitable foreign metals for replacing interconnected metal (including alloys and intermetallics) may include, for example, nickel, silver, iron, titanium, copper, uranium, chromium, cobalt, vanadium, silicon, molybdenum, tungsten, germanium, tin, magnesium, yttrium, zirconium, hafnium, niobium, molybdenum, manganese, platinum, palladium, gold, zinc, aluminum, and lead, and their alloys and intermetallics including stainless steels, carbon steels, and special purpose alloys, such as Inconels ®, Hastelloys ®, Waspalloys ®, Monels ®, and Stellites ®.

Figure 2:
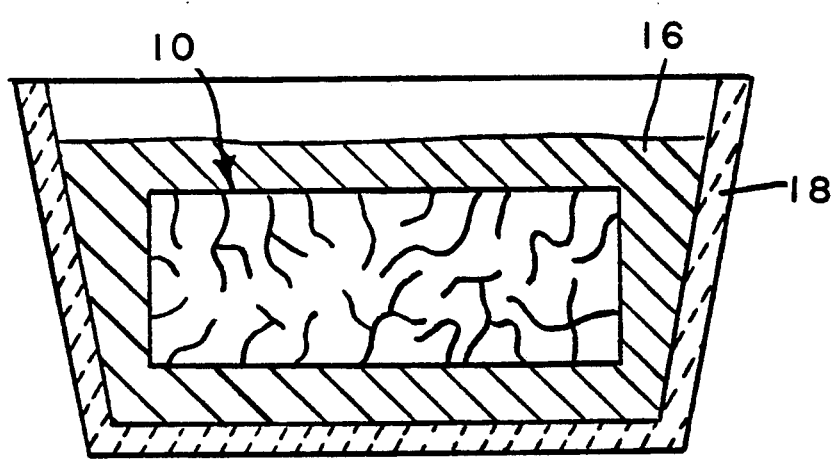
FIG. 2 is a schematic diagram representing an embodiment of the method of the present invention.

In a preferred embodiment, such as shown in FIGS. 1 and 2, the ceramic body 10 is immersed or submerged in a pool of molten foreign metal 16 contained in crucible 18. Where desired, the ceramic body may be partially immersed in the pool of molten foreign metal so as to limit the depth of metal displacement within the ceramic body, especially to limit such displacement at or adjacent a surface only. For example, if a foreign metal is to be incorporated into the ceramic body to improve its corrosion resistance or hardness, it may be necessary or desirable to modify the surface(s) only. The volume of foreign metal 16 is typically greater than the volume of accessible, interconnected metal-containing component originally formed in the ceramic body 10. In this manner, maximum or optimum displacement of the metal-containing component with the foreign metal is more readily achievable. That is, it is beneficial to have a sufficient amount of foreign metal so that upon reaching equilibrium, the overall concentration of the original metal-containing component is substantially lower than that of the foreign metal, thereby achieving a more complete replacement of original metal component with foreign metal. The volume of foreign metal is typically 5 to 50 times greater than the volume of the interconnected metal component, or at least that portion of interconnected metal to be displaced, but may be greater. This volume difference depends on such factors as the percent displacement desired, and the depth of displacement desired within the ceramic body. For example for, a ceramic body of α-alumina formed upon air oxidation of aluminum parent metal and having a substantial amount of an aluminum-containing component to be replaced by nickel, it is preferred to have at least 20 times by volume more nickel foreign metal to displace about 95% by volume of the original interconnected aluminum-containing component, thereby enhancing the toughness and corrosion resistance properties of the final ceramic body. Where desired, a lower proportion of foreign metal may be utilized in the process when it is desired to replace less of the original metal-containing component, that is, to intentionally leave in the ceramic body a significant amount of the original metal-containing component. This result would be desirable, for example, when forming alloys between the foreign metal and the original metal component, which alloys would have properties different from or superior to either the original component or the foreign metal.

Another factor in determining displacement in conjunction with volume ratios is the solubility or miscibility of the foreign metal with the metal-containing component. Thus, interdiffusion and displacement of one metal for the other is increased with increased solubility or miscibility.

The amount or degree of interdiffusion may be controlled by the length of time the ceramic body is in contact with the foreign metal. The contact time may be relatively short for such embodiments where displacement is to occur only at or near the surface of the ceramic body. That is, the metal-containing component at the surface(s) of the ceramic body would be displaced with foreign metal thereby leaving the remainder or interior of the ceramic body substantially unaltered.

Temperature, as well as time, is selected to control the depth of interdiffusion and the rate at which interdiffusion occurs. For example, the temperature can be kept below the melting point of one or both of the metals in order to provide solid-solid interdiffusion or solid-liquid interdiffusion, both of which are usually slower than liquid-liquid interdiffusion. Lower temperatures are useful when displacement is to be at or near the surface of the ceramic body rather than throughout the entire body. In addition, the temperature can be selected to change (decrease or increase) the viscosity and/or miscibility of the metals, thereby changing the rate of interdiffusion. Temperature may be used also to favor the presence of particular alloys or intermetallic compounds in the end product.

Thus, the temperature and time at which the system is processed may depend on a number of factors such as the composition of the metal-containing component in the ceramic body as originally formed, the composition of the foreign metal, the amount of interdiffusion desired, and the depth of displacement desired in the ceramic body. Preferably, in most cases the temperature used should be above the melting point of at least one of the metals and more preferably in most cases above that of both metals. In addition, a higher temperature may be selected so as to increase the rate at which interdiffusion occurs. In the embodiment wherein an α-alumina ceramic body is formed from an aluminum parent metal and air thereby leaving an aluminum metal-containing component, and nickel is employed as the foreign metal, the preferred temperature range for liquid-liquid interdiffusion is about 1650° C., which is at or slightly above the melting point of nickel, as well as aluminum, and any resulting intermetallics formed in the process. Also, when the volume ratio of nickel to metal-containing component is about 20:1, about 95% of the metal-containing component can be replaced with nickel in about 55 to 75 hours or less given a sample of approximately 0.100–0.125 inch thickness having interconnected metal. It should be understood, however, that these volume ratios and time and temperature conditions are illustrative only, and that the process conditions can be modified. Solid-liquid interdiffusion may be conducted at a temperature below the melting point of nickel but above the melting point of aluminum, but the rate of interdiffusion would be slower. Still further, the process may be conducted at an elevated temperature but below the melting point of aluminum for solid-solid interdiffusion, which may be desirable for displacement to only a very limited surface depth of the ceramic body.

Where desired, the system of the ceramic body and/or body of foreign metal may be agitated or vibrated to promote mixing and thereby enhance the interdiffusion process. In particular, ultrasonic energy may be applied to the crucible or vessel holding the ceramic body and foreign metal to thereby increase the rate at which the interdiffusion proceeds. Alternatively, the crucible or ceramic body may be mechanically shaken or stirred during all or part of the process.

In the preferred embodiment utilizing liquid-liquid interdiffusion, the ceramic body is removed from the holding crucible while the foreign metal is still molten. Excess metal is allowed to drain from the surfaces of the ceramic body. It has been found that wetting and/or capillary action is usually sufficient to retain the modified metal-containing component within the ceramic body. The surfaces of the ceramic body can be finished or cleaned by grinding, machining, grit blasting, etching, or the like, or left as is.

As explained above, the ceramic body is produced from a suitable parent metal according to the processes disclosed in the commonly owned patent applications. In one preferred embodiment of this invention, a composite is produced by utilizing a mass of filler material placed adjacent to and in contact with a surface of the parent metal, and the process is continued until the oxidation reaction has infiltrated the bed of filler material to its boundary which can be defined by a suitable barrier means. The mass of filler, which preferably is shaped as a preform, is sufficiently porous or permeable to allow the oxidant, in the case of a gas-phase oxidant, to permeate the filler and contact the metal, and to accommodate growth of the oxidation reaction product within the filler. Alternatively, the oxidant may be contained within or comprise the filler. The filler may include any suitable material such as particulates, powders, platelets, hollow bodies, spheres, fibers, whiskers, etc., which typically are ceramic materials. A metallic filler material may be used such as metal particles or fibers, if protected by a coating from interdiffusion with the foreign metal, or if it is desired to also modify the properties of the filler by interdiffusion with the foreign metal. Further, the bed of filler may include a lattice of reinforcing rods, plates, or wires. Typically in these polycrystalline ceramic structure, including ceramic composites, the oxidation reaction product crystallites are interconnected and the metal-containing component is at least partially interconnected and accessible from an external surface of the ceramic body.

As explained in the commonly owned patent applications, dopant materials used in conjunction with the parent metal can, in certain cases, favorably influence the oxidation reaction process, particularly in systems employing aluminum as the parent metal. The function or functions of a dopant material can depend upon a number of factors other than the dopant material itself. Such factors include, for example, the particular combination of dopants when two or more dopants are used, the use of an externally applied dopant in combination with a dopant alloyed with the parent metal, the concentration of the dopant(s), the oxidizing environment, and the process conditions.

The dopant or dopants used in conjunction with the parent metal (1) may be provided as alloying constituents of the aluminum parent metal, (2) may be applied to at least a portion of the surface of the parent metal, or (3) may be applied to or incorporated into part or all of the filler material or preform, or any combination of two or more of techniques (1), (2) and (3) may be employed. For example, an alloyed dopant may be used solely or in combination with a second externally applied dopant. In the case of technique (3), where additional dopant or dopants are applied to the filler material, the application may be accomplished in any suitable manner as explained in the Commonly Owned Patent Applications.

Dopants useful for an aluminum parent metal, particularly with air as the oxidant, include magnesium, zinc, and silicon either alone or in combination with each other or in combination with other dopants, as described below. These metals, or a suitable source of the metals, may be alloyed into the aluminum-based parent metal at concentrations for each of between about 0.1-10% by weight based on the total weight of the resulting doped metal. These dopant materials or a suitable source thereof (e.g. MgO, ZnO, or $SiO_2$) may also be used externally to the parent metal. Thus, an alumina ceramic structure is achievable for an aluminum silicon alloy as the parent metal using air as the oxidant by using MgO as a surface dopant in an amount greater than about 0.0008 gram per gram of parent metal to be oxidized and greater than 0.003 gram per square centimeter of parent metal upon which the MgO is applied.

Additional examples of dopant materials effective with aluminum parent metals oxidized with air include sodium, germanium, tin, lead, lithium, calcium, boron, phosphorus, and yttrium which may be used individually or in combination with one or more other dopants depending on the oxidant and process conditions. Rare earth elements such as cerium, lanthanum, praseodymium, neodymium, and samarium are also useful dopants, and herein again especially when used in combination with other dopants. All of the dopant materials as explained in the commonly owned patent applications are effective in promoting polycrystalline oxidation reaction product growth for the aluminum-based parent metal systems.

A solid, liquid or vapor-phase (gas) oxident, or a combination of such oxidants, may be employed, as noted above. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed, specific embodiments of the invention are described below with reference to use of vapor-phase oxidants. If a gas or vapor oxidant, e.g., air, as the vapor-phase oxidant, is used in conjunction with a filler, the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air, therefore, falls within the definition of an "oxygen-containing gas" oxidant but not within the definition of a "nitrogen-containing gas" oxidant. An example of a "nitrogen-containing gas" oxidant as used herein and in the claims is "forming gas", which contains about 96 volume percent nitrogen and about 4 volume percent hydrogen.

When a solid oxidant is employed, it is usually dispersed through the entire bed of filler or through a portion of the bed adjacent the parent metal, in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed, the entire bed of filler, or a portion thereof adjacent the molten metal, is impregnated with the oxidant. The filler, for example, may be coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses.

A barrier means may be used in conjunction with the filler material or preform to inhibit growth or development of the oxidation reaction product beyond the barrier when vapor-phase oxidants are employed in the formation of the ceramic body. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (Plaster of Paris), calcium silicate, and Portland cement, and mixtures thereof, which typically are applied as a slurry or paste to the surface of the filler material. These barrier means also may include a suitable combutible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulate, desirably having a mesh size of about 20–1000, but may be still finer. Other suitable barriers include refractory ceramics or metal sheaths which are open on at least on end to permit a vapor-phase oxidant to permeate the bed and contact the molten parent metal.

The following examples illustrate the practice of certain aspects of the invention.

Ceramic bodies comprising α-alumina and interconnected aluminum were prepared for each of the five examples below by oxidizing in air 5052 aluminum alloy as the parent metal (nominally containing 2.5 weight percent magnesium and about 1 weight percent other species) by the method described above. Silicon dioxide (minus 140 grit) as dopant was externally applied to the upper surface of each metal ingot, and each ingot was placed in a bed of alumina refractory grain (90 grit E1 Alundum from Norton Co.) such that the growth surface was flush with the surface of the bed and directly exposed to the air. The process conditions for each run are set forth in Table 1 below. X-ray mapping analysis employing Energy Dispersive Spectrometry (EDS), to illustrate the elemental distribution of the phases within the resulting ceramic bodies, confirmed the presence of metallic aluminum. The interconnectivity of the aluminum has been demonstrated by electrical conductivity measurements. The same X-ray EDS technique was employed on the ceramic bodies in Run 1 (Example 1) and Run 3 (Example 3) subsequent to the modification of the metal component of each. The optical photomicrographs and the computer-enhanced maps resulting from those analyses are shown in FIGS. 3a–d and 4a–d, respectively.

TABLE 1

| | | PROCESS CONDITIONS | | |
|---|---|---|---|---|
| Run | Ingot Size | External Dopant | Set Point Temperature | Time at Set Point Temperature |
| 1 | 2 bars 8½" × 2" × ½" | 1 g | 1125° C. 5 hours ramp up 5 hours ramp down | 72 hours |
| 2 | 8 bars 9" × 2" × ½" | 1 g | 1125° C. 5 hours ramp up 20 hours ramp down | 17 days |
| 3 | 8 bars 2" × 9" × ½" plus 2 plates 8" × 9" × ½" | 12 g | 1125° C. 10 hours ramp up 15 hours ramp down | 154 hours |
| 4 | 1 bar 2" × 9" × ½" | 4.9 g | 1050° C. 6 hours ramp up 20 hours ramp down | 192 hours |
| 5 | 3 bars 9" × 8" × ½" | 1 g | 1125° C. 10 hours ramp up 30 hours ramp down | 168 hours |

EXAMPLE 1

Figure 3A:
FIG. 3a is an optical photomicrograph, magnified 1000 times, of the ceramic body produced in Run 1 and employed in Example 1 before modification of its metallic component.
Figure 3B:
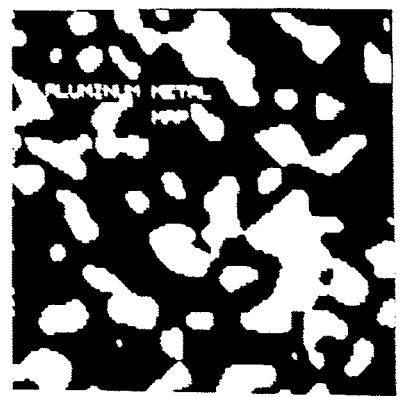
FIG. 3b is a computer-enhanced X-ray map, magnified 1000 times, of FIG. 3a wherein Energy Dispersive Spectrometry is employed to illuminate the aluminum metal present.
Figure 3C:
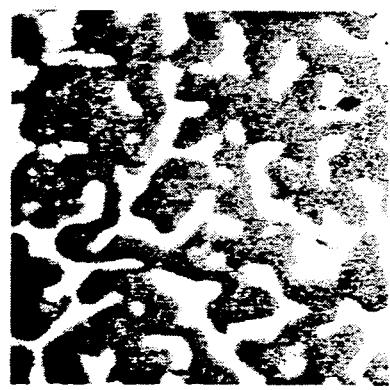
FIG. 3c is an optical photomicrograph, magnified 1000 times, of the ceramic body produced in Run 1 and employed in Example 1 subsequent to modification of its metallic component in accordance with Example 1.
Figure 3D:
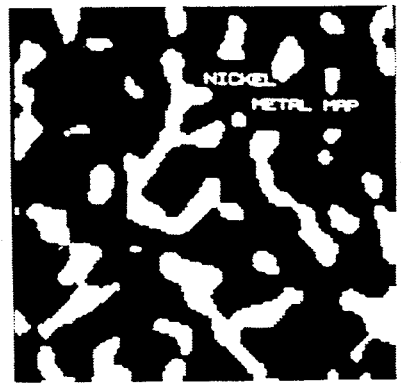
FIG. 3d is a computer-enhanced X-ray map, magnified 1000 times, of FIG. 3c wherein Energy Dispersive Spectrometry is employed to illuminate the nickel metal present.

A nickel block weighing 20.06 grams was placed on top of a ceramic body produced in Run 1 weighing 7.63 grams and measuring 1 11/16 in. × 7/16 in. × 3/16 in. thick. This setup of the nickel and ceramic was then wrapped in nickel foil (0.127 mm. thick). This setup was heated at 1200° C. for 69½ hours in an argon gas atmosphere flowing at a rate of 25 cc/minute. The resulting ceramic body had an interconnected, metal-containing component comprising Ni—Al phases containing approximately 33.0 to 48.3% by weight Ni, 51.2 to 66.4% by weight Al, and trace amounts of Si, as shown by Energy Dispersive (EDS) X-ray analysis. FIG. 3a is an optical photomicrograph at 1000× magnification of the ceramic product of Run 1, and FIG. 3b is a computer-enhanced map by EDS of this product to show the aluminum metallic component. FIG. 3c is an optical photomicrograph at 1000× magnification of the final product of this Example 1 after modification, and computer-enhanced mapping by EDS of this product was employed to illustrate the distribution of nickel in FIG. 3d. These maps clearly illustrate the modification of the original metal component by displacing at least a portion of the aluminum with nickel.

EXAMPLE 2

The procedure of Example 1 was repeated using a ceramic block from Run 2 weighing 6.36 grams and a nickel block weighing 15.9 grams, but at a temperature of 1525° C. for 66.5 hours. The interconnected metal component in the final product was analyzed by energy dispersive X-ray analysis as comprising approximately 94.5% by weight nickel and 5.5% by weight aluminum.

EXAMPLE 3

Figure 4A:
FIG. 4a is an optical photomicrograph, magnified 1000 times, of the ceramic body produced in Run 3 and employed in Example 3 before modification of its metallic component.
Figure 4B:
FIG. 4b is a computer-enhanced X-ray map, magnified 1000 times, of FIG. 4a wherein Energy Dispersive Spectrometry is employed to illuminate the aluminum metal present.
Figure 4C:
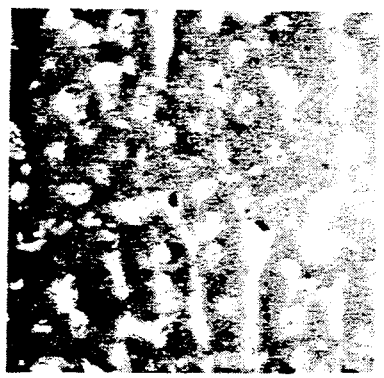
FIG. 4c is an optical photomicrograph, magnified 1000 times, of the ceramic body produced in Run 3 and employed in Example 3 subsequent to modification of its metallic component in accordance with Example 3.
Figure 4D:
FIG. 4d is a computer-enhanced X-ray map, magnified 1000 times, of FIG. 4c wherein Energy Dispersive Spectrometry is employed to illuminate the copper metal present.

A ceramic body from Run 3 weighing 2.70 grams (measuring 15/16 in. × ⅜ in. × ⅛ in.) was placed in a ceramic boat and covered with 39.90 grams of copper shot (99.9% purity). An optical photomicrograph at 1000× magnification of the product of Run 3 is shown in FIG. 4a, and this same product is shown in FIG. 4b which is a computer-enhanced map by EDS at 1000× magnification to illuminate the aluminum metal present. A 4.90-gram alumina block was placed on top of the shot to prevent the body from floating. The setup was heated for 24 hours at 1250° C. in an argon atmosphere flowing at a rate of 5–10 cc/minute. The average copper content in the interconnected metal constituent of the final ceramic product was about 41.2 weight percent and for aluminum about 57.8 weight percent, the balance being trace amounts of silicon and magnesium. FIG. 4c is an optical photomicrograph at 1000× magnification of the modified product, while FIG. 4d illustrates the distribution of copper as determined by computer-enhanced EDS X-ray mapping.

EXAMPLE 4

A 1.92 gram sample (measuring 13/16 in. × 5/16 in. × ⅛ in.) of the ceramic body from Run 4 was placed in a 1018 steel container with a lid, the total weighing 19.53 grams, and heated in a ceramic boat at 1350° C. for 48¼ hours. The metallic constituents of the final ceramic product included only about 66.1 weight percent of aluminum and significant amounts of iron and manganese from the the 1018 steel, demonstrating that the original metal component was partially displaced by the foreign metal.

EXAMPLE 5

A ceramic body from Run 5 measuring ⅜″ × 1/10″ × ⅜″ was placed in ceramic crucible and covered with 125 grams of purified silver shot (S-166 from Fisher Scientific Co.). A crossbar, cemented to the crucible edges, prevented the sample from floating. The setup was heated at 1000° C. in air for 16 hours. On analysis, the metal component of the final product contained about 97 weight percent silver and about 3 weight percent aluminum.

What is claimed is:

1. A self-supporting ceramic body which comprises (a) α-alumina as a polycrystalline oxidation reaction product formed upon oxidation of molten aluminum metal precursor with a vapor-phase oxidant, and (b) about 1–40 volume percent interconnected metal-containing component at least partially open to at least one surface of said ceramic body and at least a portion of which is derived from an extrinsic source by interdiffusion, occurring post-operatively to formation of said polycrystalline oxidation reaction product, between a first metal formed in situ during formation of said polycrystalline oxidation reaction product and a second metal from said extrinsic source, whereby said ceramic body has at least one property modified from that formed upon said oxidation.

2. The self-supporting ceramic body of claim 1, wherein the volume of said second metal in said metal-containing component is at least about 5 times greater than the volume of said first metal.

3. The self-supporting ceramic body of claim 2, wherein the volume of said second metal in said metal-containing component is about 5 to 50 times greater than the volume of said first metal.

4. The self-supporting ceramic body of claim 1, wherein said second metal comprises at least one metal selected from the group consisting of Ni, Ag, Fe, Ti, Cu, U, Cr, Co, V, Si, Mo, W, Ge, Sn, Mg, Yt, Zr, Hf, Nb, Mo, Mn, Pt, Pd, Au, Zn, Pb, and alloys and intermetallics thereof.

5. The self-supporting ceramic body of claim 1, wherein said interconnected metal containing component further comprises at least one intermetallic.

6. The self-supporting ceramic body of claim 1, wherein said second metal comprises Ni.

7. The self-supporting ceramic body of claim 1, wherein said second metal comprises Cu.

8. The self-supporting ceramic body of claim 1, wherein said second metal comprises Ag.

9. The self-supporting ceramic body of claim 1, wherein said modified property comprises at least one property selected from the group consisting of fracture toughness, hardness, wear resistance, electrical conductivity, thermal conductivity and chemical stability.

* * * * *